United States Patent [19]

Trusty et al.

[11] Patent Number: 5,000,385
[45] Date of Patent: Mar. 19, 1991

[54] SPRAY BOOM BREAKAWAY APPARATUS

[75] Inventors: Dennis L. Trusty; Knute K. Brock; William D. Long, all of Bismarck, N. Dak.

[73] Assignee: Clark Equipment Company, South Bend, Ind.

[21] Appl. No.: 394,737

[22] Filed: Aug. 16, 1989

[51] Int. Cl.[5] ............................................. B05B 1/20
[52] U.S. Cl. ........................................ 239/168; 248/900
[58] Field of Search ........................... 239/163–169; 248/900

[56] References Cited

U.S. PATENT DOCUMENTS

| | | | |
|---|---|---|---|
| 2,793,909 | 5/1957 | Gerbracht | 239/167 |
| 3,147,925 | 9/1964 | Compton et al. | 239/587 |
| 3,395,503 | 8/1968 | Greenburg et al. | 239/166 |
| 3,544,009 | 12/1970 | Schlueter | 239/167 |
| 3,809,316 | 5/1974 | Dreyer | 239/167 |
| 3,927,832 | 12/1975 | Robison et al. | 239/168 |
| 4,039,147 | 8/1977 | Hugg | 239/167 |
| 4,138,063 | 2/1979 | Batts | 239/168 |
| 4,200,255 | 4/1980 | Schmidt et al. | 248/289 |
| 4,221,353 | 9/1980 | Kuhn et al. | 248/292.1 |
| 4,344,572 | 8/1982 | Tyler | 239/168 |
| 4,427,154 | 1/1984 | Mercil | 239/167 |
| 4,441,655 | 4/1984 | Blumhardt | 239/167 |
| 4,595,140 | 6/1986 | Harden et al. | 239/167 |
| 4,634,051 | 1/1987 | Dudley | 239/168 |
| 4,790,484 | 12/1988 | Wall | 239/168 |
| 4,834,249 | 5/1989 | Dahl | 212/266 |

OTHER PUBLICATIONS

Melroe Company, 6 Photographs of Spray Boom Breakaway Apparatus, mounted on 3 sheets containing brief description of photographs, entitled "Old Design".

Primary Examiner—Andres Kashnikow
Assistant Examiner—Michael J. Forman
Attorney, Agent, or Firm—Kinney & Lange

[57] ABSTRACT

The present invention is directed to an improved breakaway apparatus for a mobile sprayer having at least one spray boom extending outwardly therefrom. The breakaway apparatus has a main plate pivotally mounted to a frame on the vehicle, and coupled by a pivotal link to the spray boom arm with a spring mounted between the main plate and the frame to urge the spray boom arm outwardly from the frame. A shock absorber is pivotally mounted to the frame and to the main plate to absorb loads placed on the spray boom arm when it is pivoted rearwardly relative to the vehicle. A generally lateral stop surface and a cushioned stop are provided on opposed portions of the frame and the main plate, and are aligned to engage when the spray boom arm is pivoted relative to the frame in a forward direction while the spray boom arm is extended for spraying. Preferably, two boom arms are provided which extend in opposite directions, with each spray boom arm having a generally independent breakaway apparatus therefor.

5 Claims, 8 Drawing Sheets

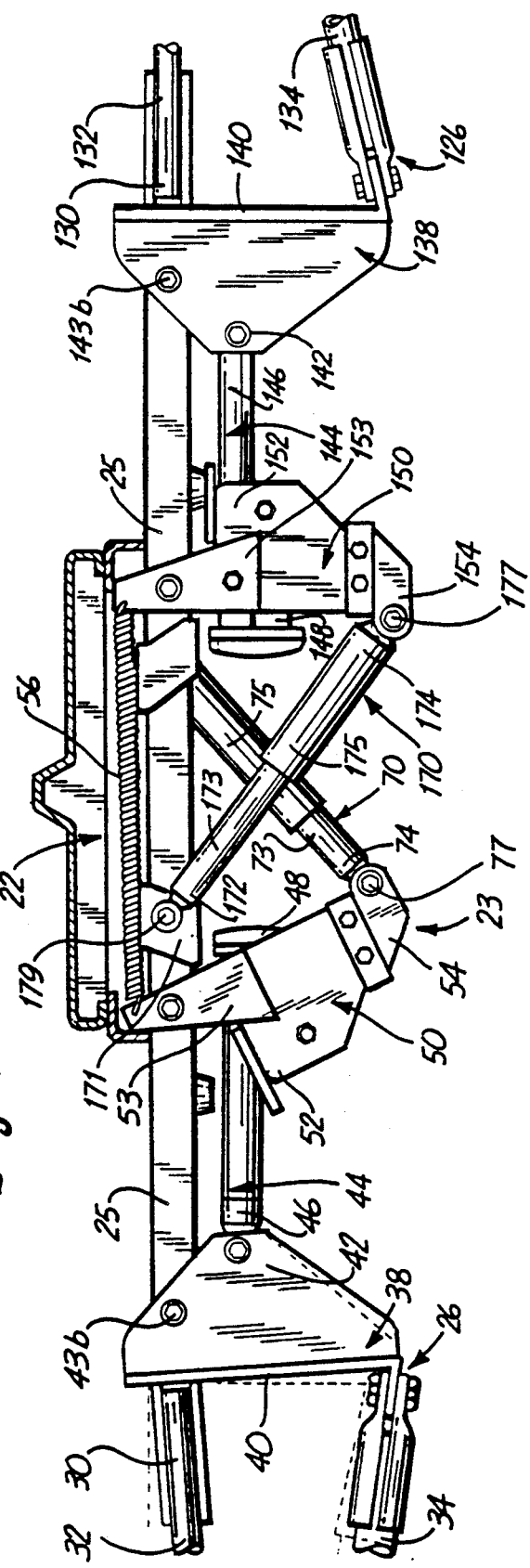

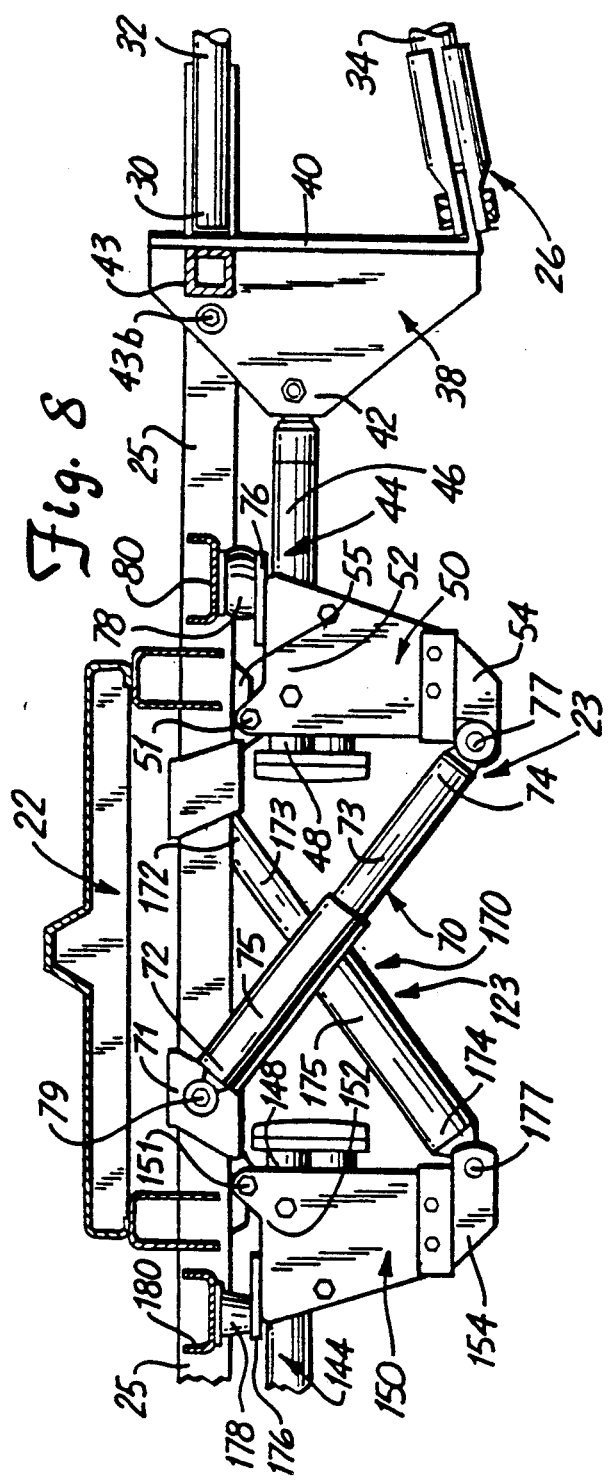

SPRAY BOOM BREAKAWAY APPARATUS

BACKGROUND OF THE INVENTION

1. Field of the Invention

The present invention relates generally to apparatus used for mounting boom structures to movable agricultural vehicles. In particular, the present invention relates to a breakaway apparatus that constrains movement of an extended boom arm to reduce stress on the boom arm and mounting apparatus when loads are placed on the boom arm during operation of the moving vehicle.

2. Description of the Prior Art

Field crops are frequently treated (sprayed) with fluids by a movable agricultural implement. The implement may be a trailer or self-propelled vehicle that carries a fluid reservoir and has a structure for transferring the fluid from the reservoir to a device through which the fluid is sprayed onto the crops. A typical fluid transfer structure is a boom arm which extends laterally outwardly from the implement frame and carries a fluid pathway from the reservoir to a plurality of spray nozzles positioned on the boom arm. Typical examples of such implements are shown in the following U.S. Pat. Nos.:

| U.S. Pat. No. | INVENTOR | ISSUE DATE |
| --- | --- | --- |
| 3,147,925 | Compton | 8 Sept. 1964 |
| 3,927,032 | Robison et al. | 23 Dec. 1975 |
| 4,138,063 | Batts | 6 Feb. 1979 |
| 4,200,255 | Schmidt et al. | 29 Apr. 1980 |
| 4,221,353 | Kuhn et al. | 9 Sept. 1980 |
| 4,344,572 | Tyler | 17 Aug. 1982 |
| 4,634,051 | Dudley | 6 Jan. 1987 |
| 4,834,249 | Dahl | 30 May 1989 |

A typical boom arm is an elongated resilient member which is pivotally mounted to the side or rear of a vehicle frame and extends outward in a substantially horizontal fashion. Typically, a boom arm extends out from each side of the vehicle, and the boom arms are rotatable (to some degree) about the vehicle frame in both horizontal and vertical directions to position the boom arms as desired relative to the field and vehicle frame. The mounting structure tends to maintain each boom arm in a selectively fixed lateral orientation (spraying position) to facilitate the spraying of the fluids onto the field.

Occasionally, objects in the field (e.g., rocks, fences, trees, etc.) obstruct the path of an extended boom arm. This places stress on the boom arm and mounting apparatus and/or impairs the functioning of the boom arm structure. Therefore, the typical mounting apparatus includes a breakaway mechanism that permits the release of the boom arm from a lateral spraying position to allow rearward horizontal rotation of the boom arm relative to the vehicle frame. The release of the arm thus diminishes the stress placed on the boom arm and mounting apparatus. The breakaway mechanism may also include a return mechanism which returns the boom arm to the spraying position, from which the boom arm has "broken away" after contacting the obstruction.

Spra-Coupe sprayers manufactured and sold by the Melroe Company of Fargo, N.D. have a pair of booms pivotally mounted to opposite sides of a frame by boom mounting or attaching plates. A pair of metal main or actuator mounting plates, one of which is associated with each boom mounting plate, are pivotally mounted to the frame between the boom mounting plates. Actuators mounted between associated boom and actuator mounting plates are used to drive the booms between folded travel positions and extended spraying positions. The actuator mounting plates are coupled together by a spring and shock absorber. When one of the booms encounters an obstruction, the boom is swung rearwardly. This motion is coupled through the actuator to the actuator plate which pivots from a stop position against a metal plate to a breakaway position compressing the shock absorber and stretching the spring. Once the obstruction is cleared, the spring returns the actuator plate to its stop position against the metal plate thereby forcing the boom to its spray position. This breakaway and return action of one boom can result in undesired motion of the other boom. Undue stress can also be placed on the frame, metal stop and actuator plate when the boom is returned to its spray position.

It is evident that there is a continuing need for improved spray boom breakaway systems. The breakaway system must be effective at preventing boom damage when obstructions are encountered, yet prevent excessive stress on the mounting frame and booms during return actions. To be commercially viable, the breakaway system must also be rugged, reliable and of relatively simple design.

SUMMARY OF THE INVENTION

The present invention is an improved spray boom breakaway apparatus for use with a spray boom arm pivotally mounted to a mobile frame. The boom arm extends laterally outward from the frame and the breakaway apparatus has a main plate pivotally mounted to the frame and a pivotal link coupling the main plate to the boom arm. The breakaway apparatus also includes a spring means mounted between the main plate and the frame to urge the spray boom arm outwardly from the frame.

The improved spray boom breakaway apparatus includes a shock absorber, a generally lateral stop surface, and a cushioned stop. The shock absorber is pivotally mounted to the frame and main plate to absorb loads which are placed on the boom arm when the boom arm pivots rearwardly relative to the frame The cushioned stop and the stop surface are mounted on opposed portions of the frame and main plate such that the stop surface and cushioned stop are aligned to engage when the boom arm is pivoted forwardly relative to the frame.

In one preferred embodiment of the present invention, the cushioned stop is an absorbent pad mounted on the frame and the stop surface is mounted on the main plate. Preferably, the pivotal link between the main plate and spray boom arm is a hydraulic actuator, which can be activated to pivot the spray boom arm relative to the frame forwardly to a storage and transport position next to the frame.

In another embodiment, in addition to the improved singular spray boom breakaway apparatus previously described, the spray boom structure has a second spray boom arm pivotally mounted to the frame and extending outwardly from the frame in an opposite lateral direction. This embodiment is a mirror image of the first embodiment and similarly includes a second main plate, a second pivotal link and the spring means mounted between the second main plate and the frame. Again, the improved apparatus has a second shock absorber, a generally lateral second stop surface, and a second cushioned stop.

In addition to the second spray boom breakaway apparatus, this embodiment also includes additional elements common to both improved breakaway apparatus. The spring means for both spray boom arms is a single coiled spring mounted between the main plate and second main plate. The mobile frame includes a lateral beam bisected by a longitudinal centerline of the mobile frame, wherein the spray boom arms, main plates and shock absorbers are all pivotally mounted to the lateral beam of the frame. Furthermore, the main plates extend rearwardly from the lateral beam and the shock absorbers are pivotally mounted to rearward portions of their respective main plates. The shock absorbers extend generally forward and lateral from the rearward portions of their main plates and are pivotally mounted at laterally spaced locations on the lateral beam such that the shock absorbers criss-cross along the centerline of the mobile frame.

BRIEF DESCRIPTION OF THE DRAWINGS

FIG. 7 is the bottom view as shown in FIG. 5, but with a shock absorber compressed and spring extended.

FIG. 8 is a partial sectional view as taken on line 4—4 in FIG. 3, illustrating a compressed cushion pad.

DETAILED DESCRIPTION OF THE PREFERRED EMBODIMENTS

Figure 1:
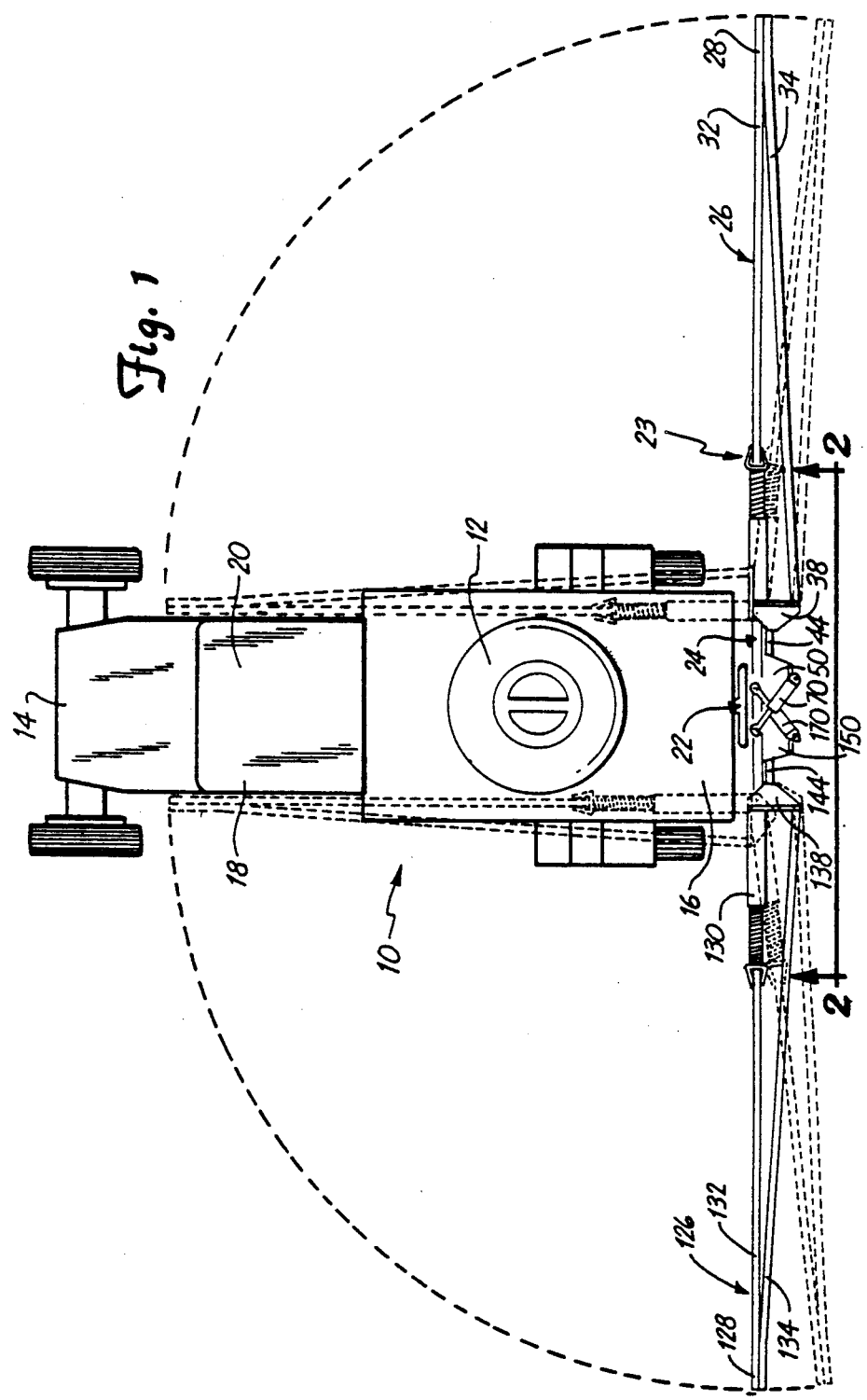
FIG. 1 is a top plan view of a movable vehicle with boom arms that incorporate the improved breakaway apparatus of the present invention.
Figure 2:
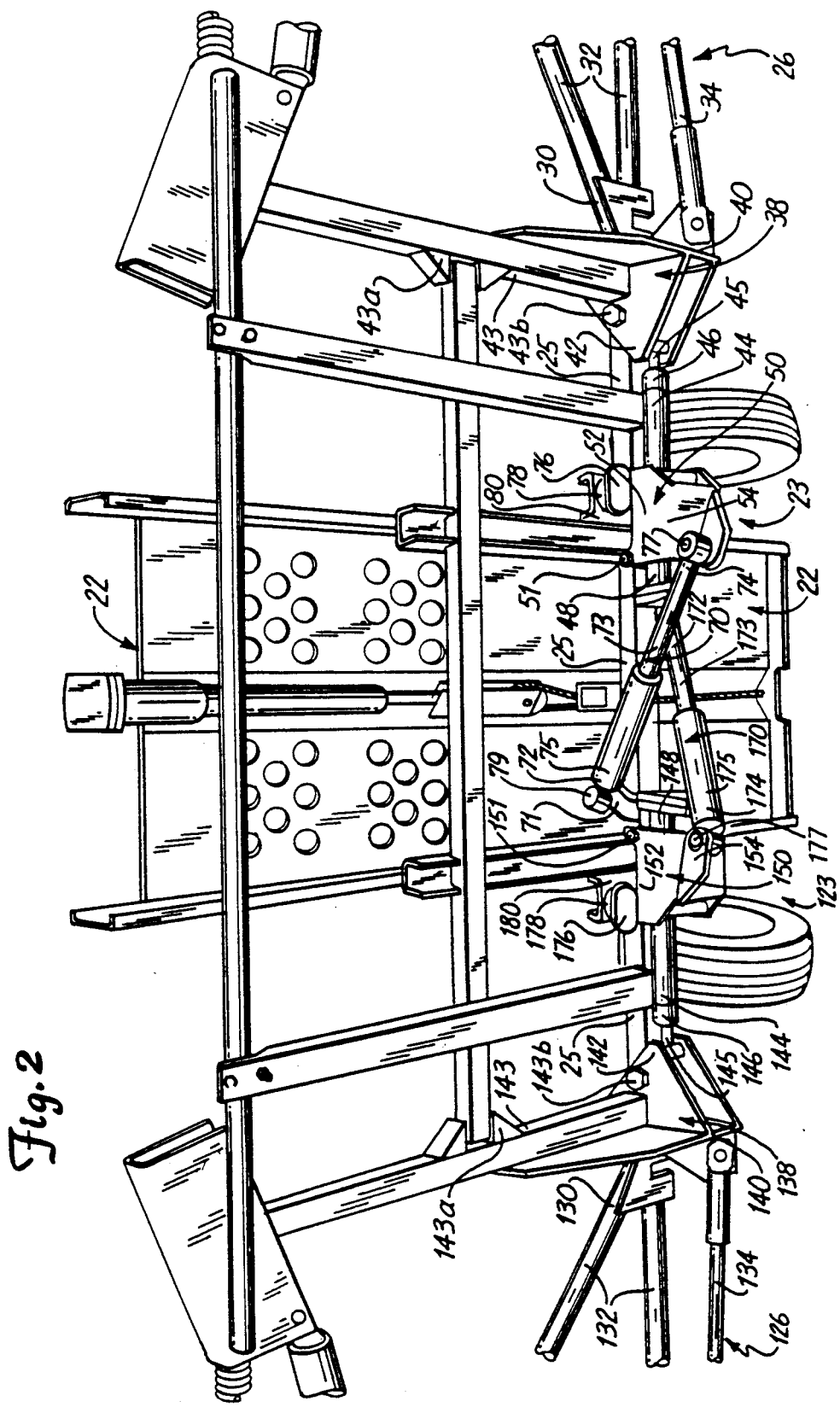
FIG. 2 is a perspective view of a spray boom positioning apparatus mounted on the rear of the vehicle in combination with the improved breakaway apparatus of the present invention.

A movable vehicle 10 with an attachable fluid reservoir 12 is shown in FIG. 1. The vehicle 10 has a front end 14 and rear end 16, as well as, a left side 18 and a right side 20 (as used herein, "right" and "left" are for reference purposes only and should not limit the intent and scope of the invention). Attached to the vehicle 10 is a support frame including a vehicle frame mount 22. The vehicle 10 is generally used to apply fluids (e.g., herbicides or insecticides) to field crops, with the fluids transported in fluid reservoir 12. Vehicle 10 is a self-propelled vehicle that generally moves in a forward direction with the front end 14 leading movement of the vehicle 10.

A basic boom arm positioning apparatus 23 is shown in FIGS. 1-8. Note that in FIGS. 5 and 7, the positioning apparatus 23 is shown in a bottom view so that boom arm 26 and corresponding elements appearing on the viewer's right in FIGS. 1-4, 6 and 8 will appear on the viewer's left in FIGS. 5 and 7. A boom arm mount 24 is attached to the vehicle frame mount 22, and the boom arm mount 24 has a lateral beam 25 extending across the rear end 16 of vehicle 10. Lateral beam 25 supports a first boom arm 26 and the positioning apparatus 23 of the first boom arm 26. Boom arm 26 has an outer end 28 and an inner end 30, where the boom arm 26 includes of a first strut 32 and a second strut 34. The inner end 30 of boom arm 26 (see FIG. 1) is shown generally attached to the right side 20 of vehicle 10 with the outer end 28 extending laterally outward from the right side 20 of vehicle 10. The first strut 32 and second strut 34 combine to form a portion of the rigid boom arm 26.

The spray boom breakaway apparatus of the present invention is designed to relieve stresses and loading forces placed on the extended boom arms of a sprayer during operation The breakaway apparatus has a series of linkages connected together by generally vertically oriented pivot axes. As used herein, however, "vertical" and "horizontal" are for reference only and are not intended to limit the scope of the invention.

A first boom attaching plate 38 has a right end 40 and a left end 42. The inner end 30 of boom arm 26, the first strut 32 and the second strut 34 are all mounted to right end 40 of attaching plate 38. Extending upward from and mounted on the boom attaching plate 38 is vertical member 43 which is pivotally mounted on a portion of the boom arm mount 24 about vertical pivot pin 43a. The boom attaching plate 38 (and boom arm 26 attached thereto) is further rotatable on a vertical axis about the boom arm mount 24 about pivot pin 43b. The pivot pins 43a and 43b are aligned coaxially to provide a common pivot axis for the boom arm 26 relative to the boom arm mount 24.

A linear actuator or link 44 has an extendable shaft 45 which extends out of a right end 46 thereof, the actuator 44 also having a left end 48. The shaft 45 is pivotally mounted to the left end 42 of boom attaching plate 38.

A first main plate 50 has a forward end 52 and a rearward end 54, with the forward end 52 pivotally attached (on a vertical axis as at pivot pin 51) to a rearwardly extending ear 55 of the lateral beam 25 of boom arm mount 24. The left end 48 of first actuator 44 is pivotally mounted within and extends through the first main plate 50. A first spring plate 53 (see FIG. 5) is mounted to and extends forwardly from the main plate 50. A spring 56 (see FIG. 5) extends between the first spring plate 53 of the first main plate 50 and a second spring plate 153 of a second main plate 150 (which is also pivotally mounted to the lateral beam 25, at pivot pin 151).

The first boom arm 26 is rotatable on a vertical axis about the boom arm mount 24. Rotation of the first boom attaching plate 38 about the boom arm mount 24 causes rotation of the first boom arm 26. When outer end 28 of first boom arm 26 rotates towards the front end 14 of vehicle 10, the first boom arm 26 is said to be moving in a first longitudinal direction. When the outer end 28 of first boom arm 26 rotates towards the rear end 16 of vehicle 10, the first boom arm 26 is said to be moving in a second longitudinal direction. The first boom arm 26 can also rotate, on a limited basis, about a horizontal axis relative to the vehicle mount 22, in order to "float" or bounce up and down as the sprayer travels through the field.

First strut 32 and second strut 34 of the boom arm 26 are separately fixed to the right end 40 of first boom attaching plate 38 such that the first strut 32 and second strut 34 act as one unit during rotation of the first boom arm 26. The first strut 32 and second strut 34 are fixed together at the outer end 28 of boom arm 26.

The first actuator 44 is extensible generally parallel to the lateral beam 25 of boom arm mount 24. The shaft 45 of actuator 44 is capable of extending laterally outward away from the main plate 50 or retracting laterally inward toward the main plate 50. When the shaft 45 is extended, the first boom attaching plate 38 is rotated about boom arm mount 24 (on pivot pin 43b), thereby causing rotation of the first boom arm 26 in the first longitudinal direction. Full extension of shaft 45 places the boom arm 26 in a storage and transport position alongside the vehicle 10. When the shaft 45 of first actuator 44 is retracted, the first boom attaching plate 38 is rotated about the boom arm mount 24, thereby causing rotation of the first boom arm 26 in the second longitudinal direction. Full retraction places the boom arm 26 in its operating position, as indicated in FIG. 4.

The first actuator 44 is typically a hydraulic actuator capable of transmitting a linear load through shaft 45. The hydraulic actuator is also capable of maintaining the shaft 45 in a selectively fixed position relative to the left end 48 of the actuator 44.

Figure 4:
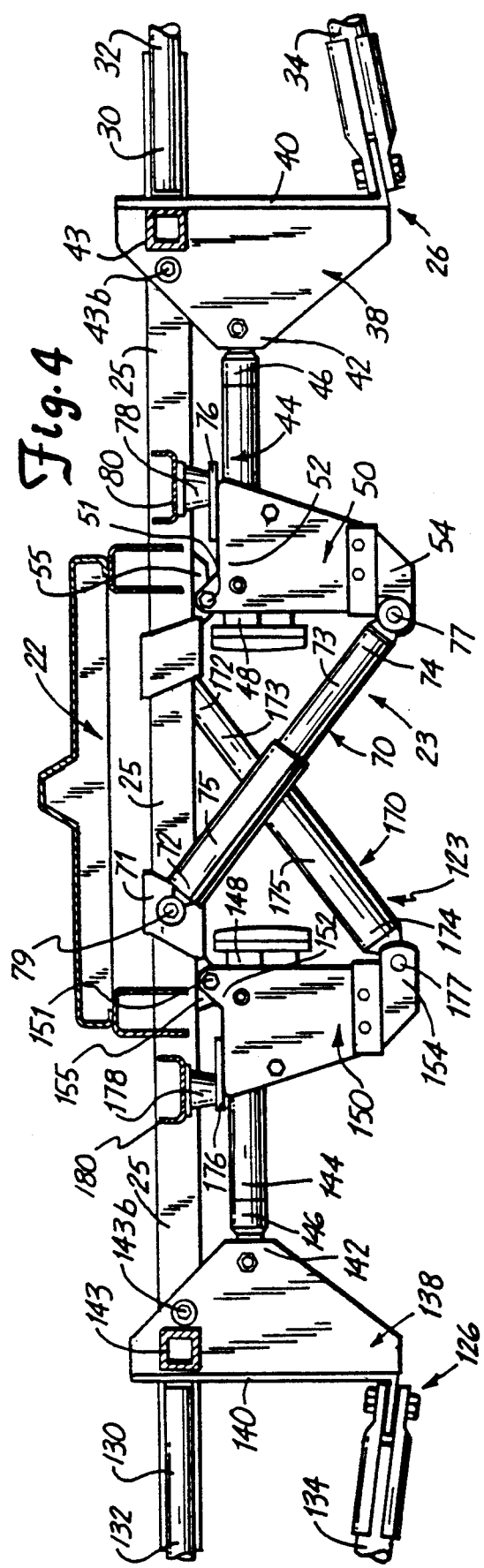
FIG. 4 is an sectional view as taken on line 4—4 in FIG. 3.
Figure 5:
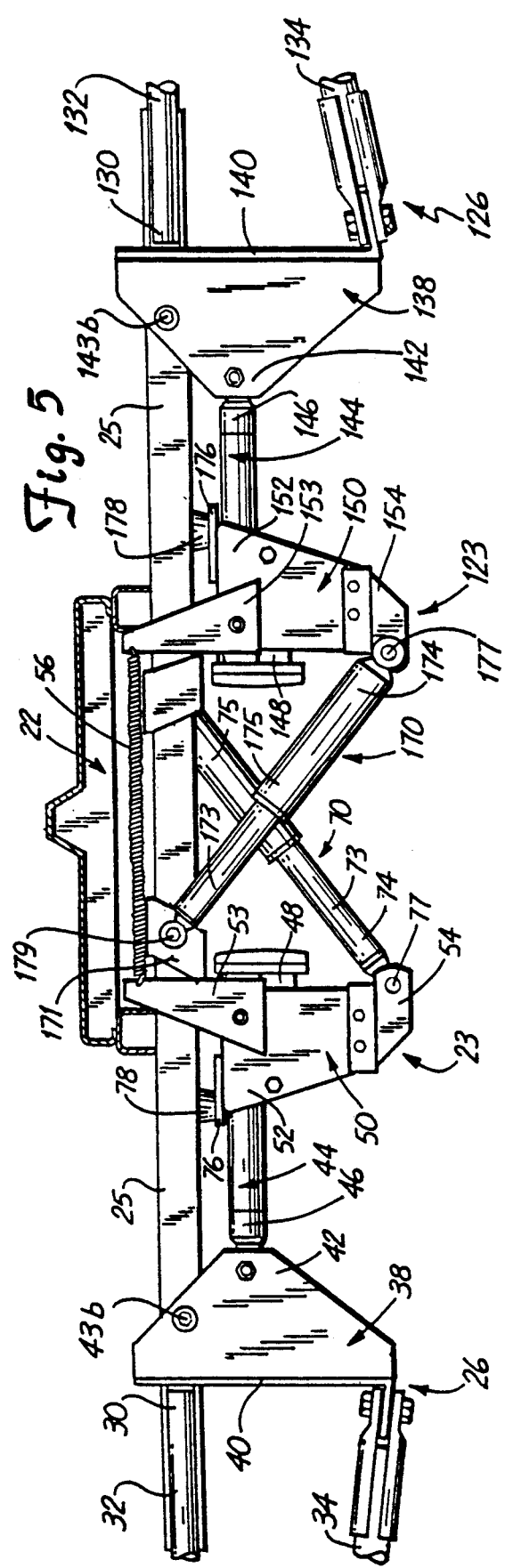
FIG. 5 is a bottom plan view of the present invention as illustrated in FIG. 4.

The first main plate 50 is pivotally mounted to lateral beam 25 (at pivot pin 51) so that upon rotation of the boom arm 26 in the second longitudinal direction, the rearward end 54 of first main plate 50 rotates about the pivot pin 51 in a laterally inward fashion (clockwise as viewed in FIG. 4). This rotation of the first main plate 50 is counteracted by the spring 56 (see FIG. 5) which resists extension and is mounted between the first mounting plate 50 and a second mounting plate 150. The tension force of spring 56 tends to rotate the boom arm 26 about its vertical pivot pin 51 (counter clockwise as viewed in FIG. 4) so that the boom arm 26 extends laterally from vehicle 10.

Typically, a plurality of spray nozzles (not shown) used for spraying the transported fluid are positioned along the length of the first boom arm 26 from its inner end 30 to its outer end 28. A fluid pathway (not shown) that brings the fluid to the nozzles, extends from the fluid reservoir 12 of the vehicle 10 to the nozzles.

The boom arm 26 is positionable into two positions (see FIG. 1) by the previously described basic boom arm positioning apparatus 23. The boom arm positioning apparatus 23 is operable to allow the boom arm 26 to be placed in a operating position as is shown in FIG. 1 (solid lines). Again, the spring 56 tends to hold the first boom arm 26 in this outward laterally extended position. The boom arm positioning apparatus is also operable to allow the boom arm 26 to be placed in a storage and transport position (shown in phantom in FIG. 1).

To place the first boom arm 26 in an operating position (as shown in FIG. 1) the extendable shaft 45 of first actuator 44 is retracted. The actuator 44 with its shaft 45 in retracted position is capable of maintaining the boom arm 26 in a laterally extended fashion during movement of vehicle 10. To place the first boom arm 26 in its storage position, the shaft 45 of the first actuator 44 is extended, thereby pushing on the left end 42 of the first boom attaching plate 38 to rotate the first boom attaching plate 38 about the boom arm mount 24. Upon rotation of the first boom attaching plate 38, the first boom arm 26 is rotated so that the first boom arm 26 is moved in the first longitudinal direction until the first boom arm 26 is parallel to the longitudinal axis of vehicle 10 along the right side 20 of vehicle 10. The boom arm 26 can then be secured to the right side 20 of vehicle 10 during movement of vehicle 10.

The compressible nature of spring 56 tends to hold the main plate 50 in an essentially non-rotatable state during movement of the shaft 45. The spring 56 also tends to maintain the main plate 50 in a nonrotatable state during retraction of shaft 45 of actuator 44 such that the retracting shaft 45 moves in a direction generally parallel to the lateral beam 25. Thus, the spring 56, main plate 50 and actuator 44 act together and tend to maintain the boom arm 26 in either a selected storage position or an operating position.

Although the boom arm structure as described is capable of maintaining the boom arm in its laterally extending operating position, existing boom arm structures do not react in a desirable fashion when the first boom arm 26 encounters an obstacle in the path of the forwardly moving vehicle 10. The obstacle is usually some fixed object such as a tree, rock or fence which contacts the first boom arm 26 such that the first boom arm 26 is rotated about the vehicle 10 in a second longitudinal direction to a stressed or contact position (as illustrated in phantom at the lower portion of in FIG. 1).

When boom arm 26 contacts an object, slight rearward movement of boom arm 26 in the longitudinal direction to the stressed position (FIG. is permitted by the extension of spring 56 (which allows rotation of main plate 50 about pivot pin 51 and thereby rotates the first boom attaching plate 38 and first boom arm 26). Simultaneously, a substantial level of stress is exerted upon actuator 44 as it tries to maintain the position of the first boom arm 26 in its laterally extended operating position This stress is exerted upon actuator 44 as long as the obstacle is still in contact with the first boom arm 26. Therefore, until the object is removed, the first boom arm 26 and actuator 44 are stressed at an undesirable level such that the vehicle 10 must be moved promptly in a rearward fashion or maneuvered to remove the obstructing object from the path of the first boom arm 26.

Despite maneuvering the vehicle 10 to remove contact of the object with the first boom arm 26 and the stress placed on first actuator 44, the initial shock and collision of the object with the first boom arm 26 may still have damaged the hydraulic actuating mechanism within actuator 44. Furthermore, even if the actuator 44 survives a severe shock from an object impacting the first boom arm 26, the fatigue life or endurance of the actuator 44 as an operable member of the boom arm positioning apparatus 23 is diminished.

The present invention of a spray boom breakaway apparatus, as seen in FIGS. 1-8, includes a first shock absorber 70, a stop plate 76 and a cushion pad 78. The first shock absorber 70 has a forward end 72 and a rearward end 74. The stop plate 76 extends upward vertically from and is mounted on the forward portion 52 of first main plate 50. The cushion pad 78 is mounted on pad mount 80 which extends upward vertically from lateral beam 25.

The first shock absorber 70 has its rearward end 74 pivotally mounted to the rearward portion 54 of first main plate 50 at pivot pin 77. The shock absorber 70 extends forwardly from the first main plate 50 to an upper portion mount 71 on lateral beam 25, where the forward end 72 of shock absorber 70 is pivotally mounted to the lateral beam 25 at pivot pin 79. The shock absorber 70 is mounted on the first main plate 50 upon the right side of the longitudinal center line of vehicle 10 and extends forwardly across the center line to the mount 71 on the left side of the longitudinal center line of vehicle 10.

Shock absorber 70 is capable of compression (see FIGS. 6-7) wherein an axial compressive load placed on the shock absorber 70 forces shaft 73 of shock absorber 70 to longitudinally retract within body 75 of shock absorber 70. The shock absorber 70 is also capable of extension when an axial tensile load is placed on the shock absorber 70 forcing the shaft 73 to extend longitudinally outward from the body 75 of shock absorber 70.

During either an axial compressive or tensile load exerted upon the shock absorber 70, the shock absorber dissipates the load as the shaft 73 is retracted and extended during a respective loading to the shock absorber 70. The shaft 73 of shock absorber 70 is normally extended to a length as shown in FIG. 4 unless a nominal level of tension or compression is placed upon the shock absorber 70, thereby moving the shaft 73 in or out of body 75 depending upon the respective load placed on shock absorber 70.

The stop plate 76 is mounted on first main plate 50 and aligned to contact the cushion pad 78 mounted on the pad mount 80. The cushion pad 78 is an absorbent pad or cushioning material which compresses upon contact of stop plate 76. The cushion pad 78 dissipates energy from the force transmitted through the contact of stop plate 76. Preferably, the cushion pad 78 is a block of rubber.

Figure 6:
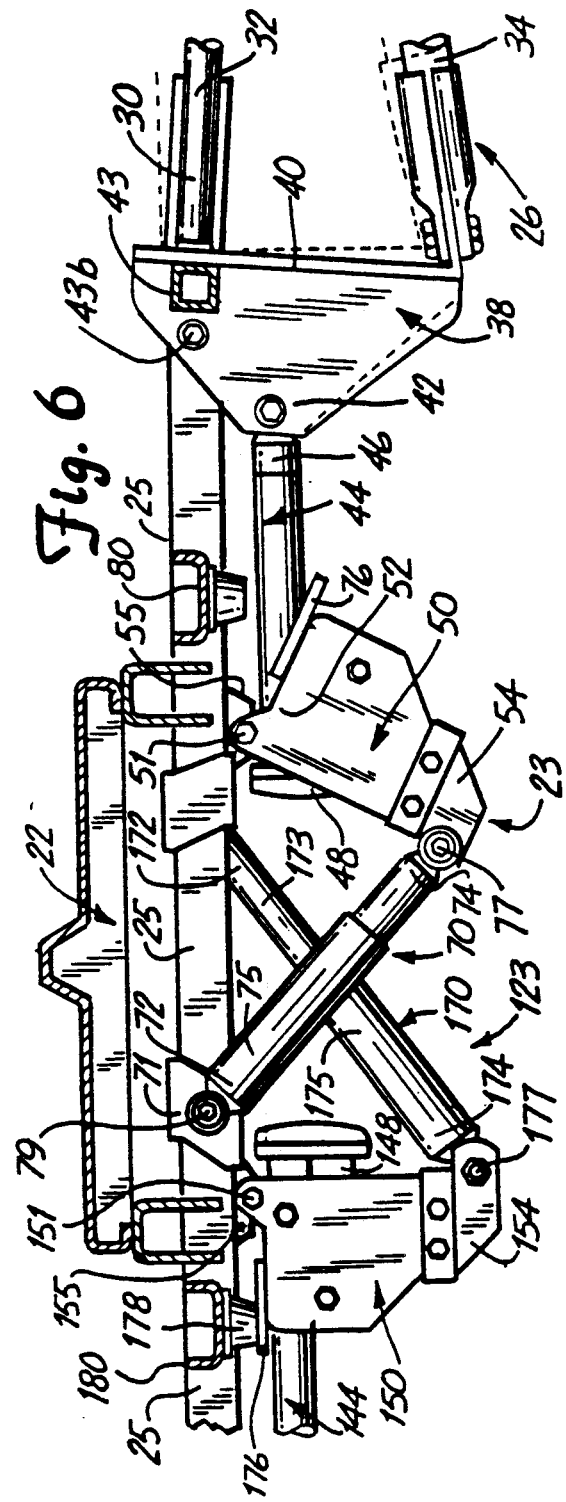
FIG. 6 is a partial sectional view, as taken on line 4—4 in FIG. 3, showing one of the shock absorbers in a compressed condition.

The present invention of the spray boom breakaway apparatus is cooperable with the previously described basic spray boom arm positioning apparatus 23. The shock absorber 70 primarily functions when the first boom arm 26 is forced in a second longitudinal direction to the stressed or contact position shown in phantom at the lower portion of FIG. 1. The first boom attaching plate 38, as illustrated in FIGS. 6-7, is thus rotated in the second longitudinal direction, forcing the actuator 44 laterally inward and transmitting force to the first main plate 50. The first main plate 50 rotates about its pivot pin 51 (clockwise in FIG. 4) and thereby transmits force through its rearward end 54 to the shock absorber 70. The force transmitted through the basic spray boom structure overcomes a nominal level of resistance in the shock absorber 70 such that the shaft 73 is pushed within body 75 to its retracted state, thereby dissipating the energy or force transmitted through the basic boom structure and alleviating stress placed on the boom arm 26 and first actuator 44.

The spring 56, as shown in FIGS. 6-7 is stretched or extended during the compression of the first shock absorber 70 so that upon dissipation of the stress on the actuator 44, the spring 56 will force a lateral outward rotation of the first main plate 50 to return the first boom arm 26 to its operating position and cause the shock absorber 70 to extend back to its normal length.

The shock dampening operation of the stop plate 76 and cushion pad 78 is illustrated in FIG. 8, where both are shown cooperating during a stressing of the first boom arm 26 in a first longitudinal direction. The boom arm 26 is extended in its operating position (see FIG. 1). Upon braking or turning of vehicle 10, a forward urging force (stress) is placed on the first boom arm 26 and first actuator 44. The force or stress from the first actuator 44 is transmitted through the stop plate 76 of main plate 50 to the cushion pad 78 which compresses, thereby dissipating the stress on the actuator 44 and arm 26.

In operation, the spray boom breakaway apparatus of vehicle 10 is operationally activated when the vehicle 10 is moving and the first boom arm 26 contacts an obstruction. If the collision of the obstruction and the first boom arm 26 causes stress on the actuator 44 and first boom arm 26 above a nominal level, then the first shock absorber 70 is compressed (see FIGS. 6-7) upon the rotation of the first main plate 50. The shock absorber 70 remains compressed until the stress exerted upon the first boom arm 26 and first actuator 44 is dissipated.

Once the force of the spring 56 overcomes the stress forces, the spring 56 then urges the boom arm 26 back into its operating position. In addition, upon removal of the object or stress placed upon the first boom arm 26, the spring 56 retracts from its extended position (see FIG. 7) and tends to move the first boom arm back to its operating position by causing extension of the shock absorber 70 to its normal position. This causes a lateral outward rotation of the first main plate 50 to ultimately rotate the boom arm 26 back into its laterally extending operation position.

When the moving vehicle 10 brakes or turns to the right with the first boom arm 26 in its operating position (see FIG. 1), the first boom arm 26 tends to rotate in a second longitudinal direction (forwardly) thereby placing stress tension forces on the first actuator 44. This in turn acts on the first main plate 50 to urge it to rotate counterclockwise about its pivot pin 51 as viewed in FIG. 8. The stop plate 76 on first main plate 50 then engages the cushion pad 78 (see FIG. 8), whereby the cushion pad 78 compresses to dissipate and absorb the stress exerted on the first actuator 44 and boom arm 26.

The present invention allows the first boom arm 26 to be maintained in its operating position or storage position without causing breakage or placing undue stress on the first actuator 44. The shock absorber 70 reduces the stress placed on the first actuator 44 when the first boom arm 26 contacts an object obstructing its path. The shock absorber 70 also reduces the stress on actuator 44 upon the return of the first boom arm 26 to its operating position by spring 56. The cushion pad 78 and stop plate 76 cooperate to further diminish stress exerted on actuator 44 by contact of main plate 50 and boom arm mount 24 during the return of arm 26.

A second spray boom positioning apparatus 123, which mirrors the previously described positioning apparatus 23 in structure and function, is shown in FIGS. 1-8. The elements of the second positioning apparatus are mounted on the lateral beam 25 of boom arm mount 24 generally left of the longitudinal center-line of vehicle 10 (as viewed in FIGS. 1-4) and match the elements of the positioning apparatus on the right of the center line of vehicle 10. The second positioning apparatus includes a second boom arm 126, with an outer end 128 and an inner end 130, as well as a first strut 132 and a second strut 134. The second boom arm 126 extends laterally from the left side 18 of vehicle 10 in an opposite direction from the laterally extending first boom arm 26. The second boom arm 126 attaches to a second boom attaching plate 138 which has a left end 140 and a right end 142, with the plate 138 pivotally mounted to lateral beam 25 of mount 24 along a vertical pivot axis defined by pivot pins 143a and 143b. A vertical member 143 extends upward from the second attaching plate 138 to define an upper portion of second spray boom arm 126.

A second actuator 144 has an extendable shaft 145 which extends out of its left end 146, the second actuator 144 also has a right end 148 extending through and pivotally mounted to a second main plate 150. The second main plate 150 has a forward end 152 and a rearward end 154, the forward end 152 being pivotally mounted to the lateral beam 25 of mount 24 along a vertical pivot axis defined by pivot pin 151. A second spring plate 153 is affixed to the bottom of forward end 152 of second main plate 150. The spring 56 is: connected between the first spring plate 53 and the second spring plate 153 (see FIG. 7). The spring thus acts on each positioning apparatus 23 and 123, and acts between them to maintain the boom arms 26 and 126 in their outward operating positions.

The second boom arm 126 is rOtatable on a generally vertical axis about boom arm mount 24 as is the first boom arm 26. The second boom arm 126 is capable of rotation in the first longitudinal direction towards the front end 14 of vehicle 10, or in the second longitudinal direction towards the rear end 16 of vehicle 10.

The second positioning apparatus operates similar to the previously described positioning apparatus and is subject to the same problems when an object obstructs the path of its boom arm. Hence, a second improved spray boom arm breakaway apparatus is cooperable with the second positioning apparatus. The second breakaway apparatus includes a second shock absorber 170, with a forward end 172 pivotally attached to lower portion mount 171 of boom arm mount 24 about pivot pin 179. The second shock absorber 170 also has a shaft 173, a rearward end 174 and a body 175, with the rearward end 174 pivotally attached to the rearward end 154 of second main plate 150 about pivot pin 177.

Figure 3:
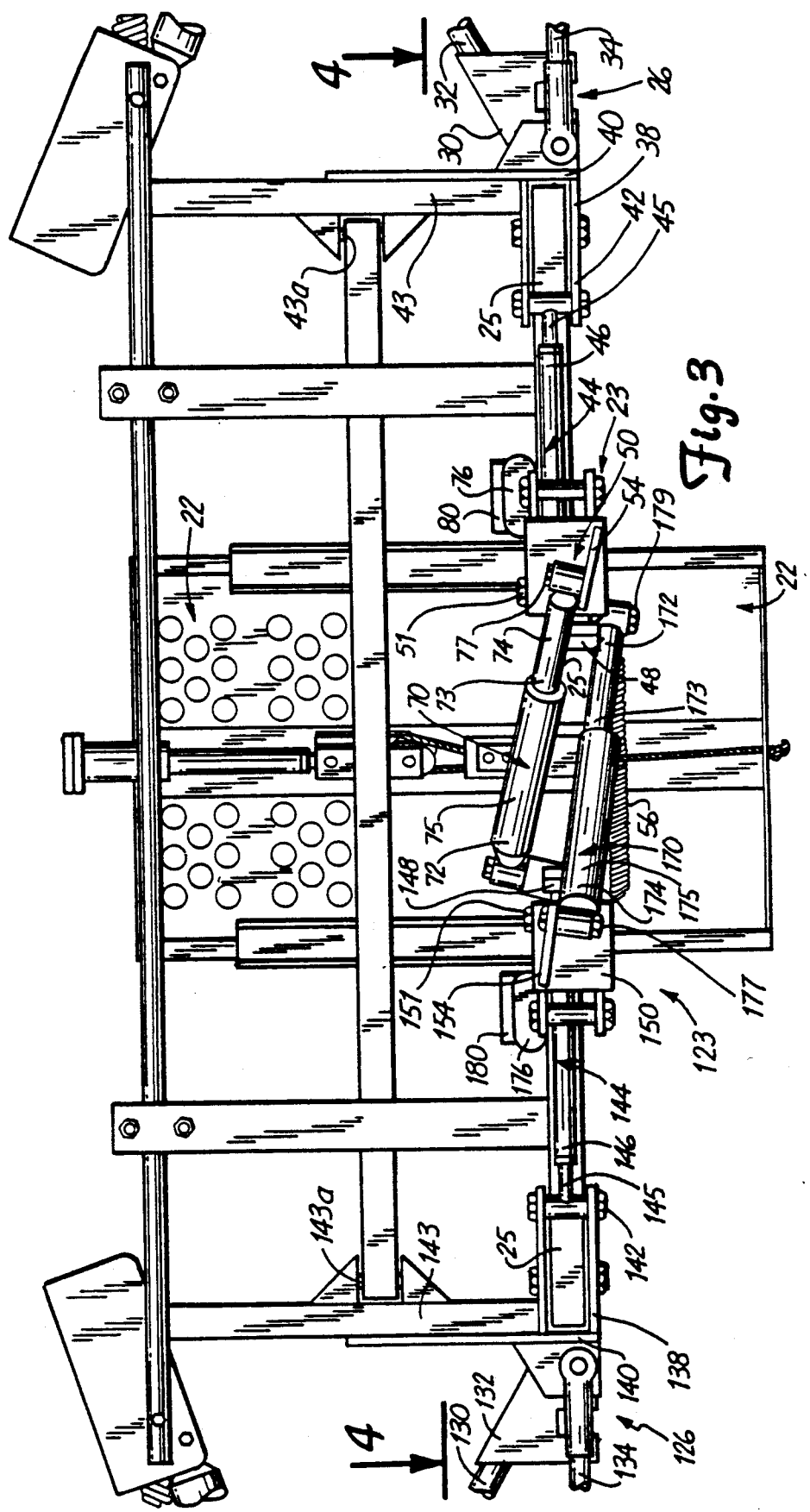
FIG. 3 is a rear elevational view of the present invention shown in FIG. 2.

As is readily apparent in the FIGS., the shock absorbers 70 and 170 criss-cross over and under one another, approximately along the longitudinal centerline of the vehicle 10. As seen in FIG. 3, the shock absorbers 170 are tilted relative to horizontal. This tilting is necessary to ensure proper operation of the shock absorbers, which are standard off-the-shelf shock absorbers designed for generally vertical alignment. Such shock absorbers do not work effectively if aligned horizontally.

A second stop plate 176 mounted on the second main plate 150 is aligned to engaged a second cushioned pad 178 which is mounted on a second stop mount 180 extending upward from lateral beam 25 of boom arm mount 24.

Similar to the previously described spray boom breakaway apparatus, the second shock absorber 170 dissipates the stress placed on the second actuator 144 when the second boom arm 126 is forced in the second longitudinal direction (rearwardly). The cushion pad 178 diminishes the stress placed on the second actuator 144 when the second stop plate 176 engages the pad 178 upon forcing of the second boom arm 126 in the first longitudinal direction (forwardly).

The spray boom breakaway apparatus may operate independently when a respective boom arm is stressed, or both of the breakaway apparatus may operate simultaneously when both boom arms are stressed. In the present configuration, the two breakaway apparatus are interconnected by the spring 56 which extends between the first and second spring plates 53 and 153 of the breakaway apparatus (see FIG. 7). In other configurations, the two breakaway apparatus for each spray boom arm may be entirely independent of one another by utilizing two springs, wherein a first spring extends from the first spring plate 53 to the boom arm mount 24 and a second spring separately extends from the second spring plate 153 to the boom arm mount 24. In this configuration, the springs still tend to maintain their respective boom arms in a laterally extended position but the two breakaway apparatus are then totally independent in structure and operation.

The present invention provides a spray boom breakaway apparatus which independently reduces the stress exerted on separate spray boom arms during operation of the moving vehicle to which they are attached. The invention is simple and consists of few parts, thus allowing easy mounting and removal from the vehicle frame and spray boom positioning apparatus. The invention also cushions portions of the vehicle frame and positioning apparatus which contact each other during stress induced movement of the boom arm.

Although the present invention has been described with reference to preferred embodiments, workers skilled in the art will recognize that changes may be made in form and detail without departing from the spirit and scope of the invention.

What is claimed is:

1. A spray boom breakaway apparatus for a spray vehicle having a frame and a pair of spray boom arms which are pivotally mounted to the frame to extend laterally outwardly from of the frame, the breakaway apparatus comprising:
   a main plate for each spray boom arm, each main plate having a forward portion and a rearward portion, with the forward portions being pivotally mounted to the frame on opposite sides of a longitudinal centerline of the frame;
   a linking member for each spray boom arm which is pivotally connected between its respective arm and the main plate for that arm;
   an elongated, axially compressible and extensible shock-absorbing member for each spray boom arm, each shock-absorbing member having a forward end and a rearward end, the rearward end of each shock-absorbing member being pivotally connected to the rearward potion of the main plate for its respective arm and extending generally forwardly and laterally therefrom to be pivotally mounted to the frame, with the shock-absorbing members being mounted to the frame on opposite sides of the longitudinal centerline of the frame, for damping motion of the main plate caused by spray boom breakaway;
   a stop surface for each spray boom arm; and
   a cushioned stop for each spray boom arm, with the stop surface and cushioned stop for each arm being mounted on opposed portions of the frame and the main plate for that arm, and aligned to limit return motion of the main plate caused by spray boom breakaway.

2. The spray boom breakaway apparatus of claim 1 wherein the cushioned stops include absorbent pads.

3. The spray boom breakaway apparatus of claim 1 wherein the linking members include linear actuators.

4. The spray boom breakaway apparatus of claim 1 and further including a spring coupling the main plates.

5. The spray boom breakaway apparatus of claim 1 and including pivotal mounts for mounting the shock-absorbing members between the respective main plates and sides of the frame in such a manner that the shock-absorbing members cross one another.

* * * * *